(12) United States Patent
Chambers et al.

(10) Patent No.: US 6,480,473 B1
(45) Date of Patent: Nov. 12, 2002

(54) VERIFICATION OF ACTIVE NODES IN AN OPEN NETWORK

(75) Inventors: Paul Chambers, San Jose, CA (US); Steven Curry, San Jose, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/222,402

(22) Filed: Dec. 29, 1998

(51) Int. Cl.[7] .......................... H04L 12/42; G06F 11/00
(52) U.S. Cl. ...................... 370/253; 370/346; 370/449; 709/251; 714/2
(58) Field of Search ................................. 370/252, 253, 370/254, 258, 346, 403, 449, 453, 454, 455, 456, 457, 450, 452; 709/220, 221, 251, 222, 224; 714/1, 2, 3, 4

(56) References Cited

U.S. PATENT DOCUMENTS 4,507,777 A * 3/1985 Tucker et al. ............... 370/258
4,663,748 A * 5/1987 Karbowiak et al. .......... 370/455
5,202,985 A * 4/1993 Goyal .......................... 709/224
5,365,513 A * 11/1994 Copley et al. ............... 370/253

FOREIGN PATENT DOCUMENTS

EP       0 777 357 A   *  6/1997

* cited by examiner

Primary Examiner—Alphus H. Hsu
Assistant Examiner—Afsar M. Qureshi
(74) Attorney, Agent, or Firm—Gwenaelle Le Pennec

(57) ABSTRACT

The present invention involves a network polling protocol which treats the network as a logical ring or linear sequence of nodes linked together so that a polling request is simply propagated down or around the network one node at a time until a complete inventory of active nodes is achieved. The protocols also includes procedures for curing or repairing breaks in the linking protocol and for adding new nodes to the linking protocol. The linking protocol can also be used to establish hierarchal linked networks where top level hierarchies includes addresses to a permanent member of a linked network and bottom level hierarchies are a given linked network.

12 Claims, 11 Drawing Sheets

VERIFICATION OF ACTIVE NODES IN AN OPEN NETWORK

FIELD OF THE INVENTION

The invention relates to an information processing system comprising a plurality of information processing nodes, wherein the nodes are functionally connected to form a network. The invention also relates to a method of enabling operation of an information processing system having a network with a plurality of information processing nodes.

BACKGROUND ART

It is known to use a broadcast protocol to verify the presence of active nodes in a network. Broadcast protocols work by sending a message to all nodes and requesting response. If a particular node needs to know what nodes are active in the network, the node broadcasts a message to all other nodes and waits for the nodes to respond to the broadcast. However, broadcast protocols are not reliable for several reasons.

First, there is no guarantee that all relevant nodes have received the message. Broadcast protocols typically rely on a best-effort-delivery assumption. Such best-effort-delivery procedures generally are not set up to ensure or verify that all nodes have received the message, but merely that an attempt has been made to notify all relevant nodes.

Second, broadcast protocols typically broadcast the message to all nodes substantially simultaneously. As a result, the nodes receive the message substantially simultaneously, and the nodes generally respond substantially simultaneously to the broadcast message. Such near-simultaneous responses can overload the network causing an avalanche-type of failure. There are ways to prevent this type of overload, e.g., by having each node respond after a time chosen randomly for each node. However, such delay schemes add an additional drawback: the protocol does not know how long to wait until all actives nodes have had a chance to respond.

Third, broadcast protocol schemes do not scale well. Each node, which makes an. inventory of the relevant nodes, has to keep a list of the relevant nodes. This implies that, in theory, each node is to be provided with a memory of undetermined size to accommodate the list.

OBJECT OF THE INVENTION

There is a need for a method to identify active, inactive and/or new nodes on the network without using a broadcast protocol with its numerous deficiencies. It is therefore an object of the invention to provide a network and a method for enabling operation or configuration of a network without having to rely too heavily on the conventional broadcast protocols mentioned above.

SUMMARY OF THE INVENTION

To this end, the invention provides a linked-node network including a network protocol that is implemented on each node of the network. The protocol is designed to form the network into a logically linked configuration of nodes such as a logical ring, chain or equivalent. The protocol includes at least one node address, a polling timer, a node counter, polling, healing and dummy tokens/messages, routines for sending and receiving tokens, for monitoring network integrity (testing for time-outs without token return), for adding or removing nodes, for healing or repairing breaks in the network when active nodes go inactive, for defragmenting a network, for fragmenting a network from a super network and for facilitating node resource sharing. The protocol can operate under natural node-timer staggering but controlled, even node-timer staggering is preferred.

Token-ring networks are known in the art. In networking, a token is a special series of bits that travels around a token-ring network. As the token circulates, an individual computer attached to the pre-configured network can capture it. The token enables the computer that owns the token to send a message across the network. There is only one token for each network. Accordingly, two or more computers are prevented from transmitting messages at the same time. The token thus serves as a protocol for defining the master of the bus interconnecting the computers. In the invention, the token is used for configuring, monitoring and/or re-configuring the network The invention further provides a super linked-node network that includes a plurality of lower-level linked-node networks. A lower-level network is also referred to as sub-network below. Each sub-network is linked in a network-by-network fashion to form either a logical ring or a logical chain configuration for implementing the super network. Each sub-network includes a network-polling protocol as mentioned above. The protocol is implemented on both the super network and individual sub-networks. The sub-networks making up the super network can be linked together through one or more linker nodes in each sub-network. The invention can also support organizing nodes into sub-links, each sub-link representing working groups of nodes. The sub-links are linked into a super network through one or more linker nodes.

The invention also provides a network protocol to form a linked-node network. The protocol includes a successor node address, a node counter and a polling message or token. The protocol further includes token sending/receiving routines, a polling timer (PT) and routines for monitoring the PT for expiration. When the PT expires after the polling token has returned, the polling token is re-propagated. On the other hand, if the polling token has not returned when the timer expires, the absence is interpreted as a break in the network. A TIME-OUT condition is posted and the protocol initiates network healing that will relink the network and suspend PT monitoring to avoid TIME-OUT conditions in other nodes. The network healing routines are designed to relink the network by replacing successor addresses which reference inactive nodes, with successor addresses that reference active nodes. As a result, the network's active nodes are reunited or relinked.

The invention provides a method implemented on each node for linking nodes together to form a linked-node network. The method includes providing each node with at least an address for a successor node, a node count, a polling message or token, and the necessary software routine. Next, the method causes the polling token to be propagated node-by-node over the network from predecessor nodes to successor nodes and resets the PT or saves the PT current value at each node concurrent with token propagation. The method then monitors for PT expiration or a TIME-OUT condition to occur. If the polling token returns (makes a full circuit of the network or successfully completes a cycle) before TIME-OUT (PT expiration), the PT is reset and the polling token is propagated forward. Normally, the duration of the PT is the network transit time. Waiting for TIME-OUT ensures that the nodes in the network are evenly time-staggered. This is so because the time it takes for a token to make a complete round-trip is independent of the node from which it started and to which it has to return as well. The protocol could simply reset the PT and immediately re-propagate the polling token, but this would result in a natural staggering of polling timers. Natural staggering results generally in a less stable network than even staggering.

If TIME-OUT occurs, a break in the network has occurred. That is, one or more active nodes have gone inactive during a polling cycle. Upon a TIME-OUT the method activates a healing protocol to relink or reunite the network. Network polling in this manner is readily generalized to linking networks together to form super networks where numerous polling token circulate over different parts of the super network, preferably in a hierarchical format.

The invention also provides a method for adding new nodes to a network. The method includes installing the network protocol of the present invention on a new node, connecting the new node to the network and broadcasting a new member message onto the network. The new member broadcast is received by a current token holder (only one per network). The current token holder updates its successor addresses to the new member's address and the new member sets its successor address with the current token-holder's current successor address. The method can also include propagating a dummy token. This causes other network nodes to suspend PT monitoring and await the propagation of the polling token after addition of the new node has been completed.

Optionally, the method includes steps to resolve conflicts and assign parenting rights to only one node in the event the new member message is received by more than one current token holder. This can occur in super networks. In the case of super networks, the new member receives several responses to its broadcast message and it has the option to join the network of any of the responding nodes. Although the new member can choose to join any network randomly, the protocol preferably provides selection based on information contained in the responses. The responses generally contain the node count and information about the respective network associated with respective node that responded. For example, the information clarifies that a responding node is the current token holder in a super network, a current token holder in a sub-network, or in a working group or sub-link. The new member generally chooses the sub-network with the least number of nodes (smallest node count) or a working group sub-link if it is a specialized node. Alternatively or conjunctively, the method can use backoff timers or the like to prevent multiple current token holders from adopting the new node.

The invention also provides a method for removing nodes from the network if a node knows that it will go inactive. The method comprises following steps. The departing node sets a flag in the polling token and places its address and the address of its successor in the token. Each node that receives the polling token is instructed to check its successor address against the departing node's address and to release any resource sharing that may exist with the departing node. When a match is found, the predecessor of the departing node updates its successor address with the address of the successor of the departing node. The predecessor of the departing node turns the remove node flag off and continues polling. Again, the protocol would also cause network node re-staggering to occur because the residence time at each node would no longer be about $1/n^{th}$ the transit time, n being the number of active nodes on the network (for detailed explanation on time staggering see below).

The invention further provides a method for curing, healing or repairing breaks in the network when a node TIME-OUT condition occurs during a polling cycle, circuit or operation. The method includes propagating a break message over the network from the node at which the TIME-OUT occurred. Each node receiving the message deactivates or suspends PT monitoring, sets a break timer, forwards the message and sends a response to its predecessor whose address in contained in the break message. When the predecessor receives the response, it deactivates its break timer. The break message propagates until it is received by a node immediately before the break. When this node sends the break message, a response does not occur and the break timer reaches a TIME-OUT. The TIME-OUT causes the node located just upstream of the break to update its successor address with the address of the TIME-OUT node. This address is contained in the break message. This node will, then, set the node counter in the polling token to zero and restart polling.

The invention further provides a method for defragmenting a network when two or more non-neighbor nodes have dropped off the network during a polling cycle. This dropping off causes the original network to fragment into two or more sub-links, each being formed via the healing method set forth above. Assume that defragmentation has occurred, and that a first current token holder broadcasts an "I have a token" message over the network. If another current token holder receives the message, it knows that the network is fragmented. In response, the second current token holder sends a message back to the first current token holder with the address of the successor of the second current token holder. The current token holders exchange successor addresses and the second current token holder propagates a dummy token forward over the successor node of the first current token holder to tell the nodes to suspend PT monitoring until they receive a new polling token.

The invention further provides a method for adjusting the timer values at each node to create an evenly staggered network. The method starts with a transit time set by the network system designer and adjusts the timers so that the polling token resides at each node for a time of about one no the network transit time, or more accurately, one no the network transit time minus the inter-node transit time, wherein n is the number of active nodes. Because the protocol is designed to operate in the background, this protocol feature ensures that the timers at each node have sufficiently long ranges so that token processing is able to occur and that other network processing such as add/remove node processes can be initiated. The method also includes start-up routines that start the timers off at some estimated timer setting The setting is then dynamically adjusted using an accumulated time and incremental time so that as token propagation continues, the timers will be adjusted to an equilibrium value which give rise to a token resident time of about one no the network transit time minus the inter-node transit time. Even timer staggering over the nodes makes for a more stable network environment.

The invention provides a network with a digital processing system, a memory system and an I/O system and encoded thereon the protocol of the invention.

BRIEF DESCRIPTION OF THE DRAWING

The invention is explained in more detail and by way of example with reference to the accompanying drawing wherein.

Throughout the figures, same reference numerals indicate similar or corresponding features.

PREFERRED EMBODIMENTS

Figure 1A:
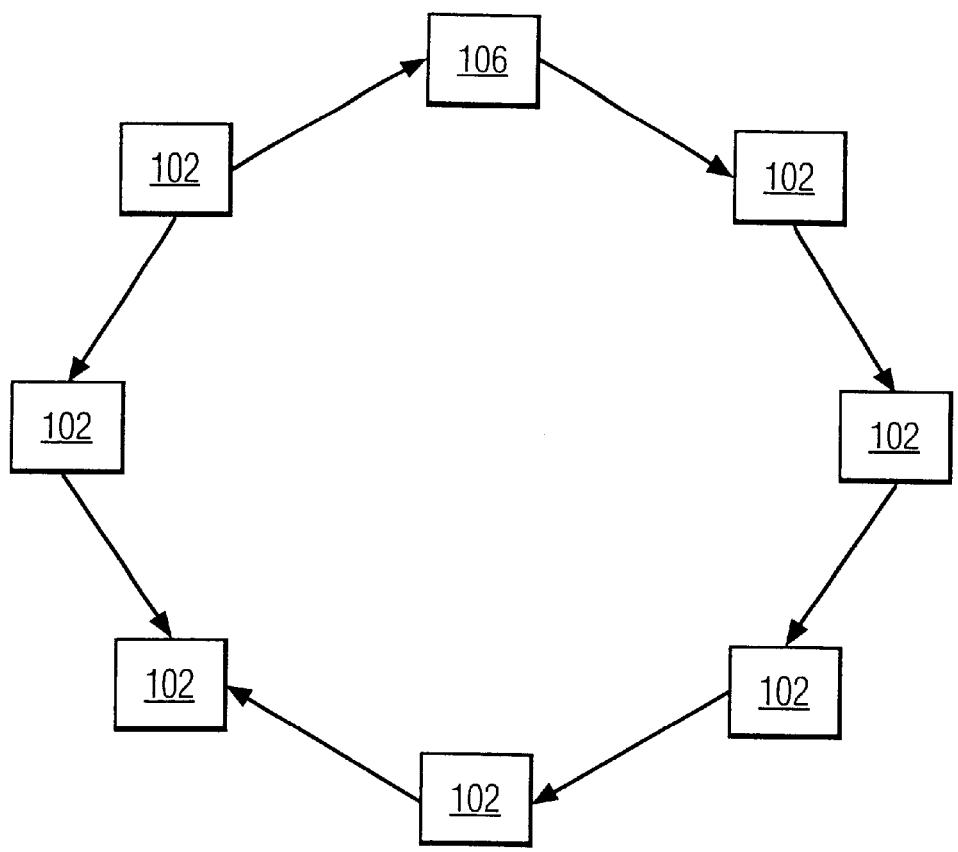
FIGS. 1A–C are block diagrams of first, second and third embodiments of a network of the invention.

The invention relates to a protocol for controlling network configuration and operation. The protocol reduces the memory requirement of each node in the sense that it is not needed for each node to track all other active nodes. The protocol facilitates network expansion, contraction, fragmentation and defragmentation. The protocol facilitates the polling of active nodes for inventory tracking and resource sharing. For the purpose of the polling, the protocol forms the nodes into a logic ring, chain or equivalent linked-node format. In mathematical terms, the protocol forms the nodes into a directed graph, preferably one that enables a link between two successive nodes to be traversed only once in completing a circuit around the network (an Eulerian graph). For more information on graphs, e.g., "Introductory Graph Theory", Gary Chartrand, Dover Publications, Inc., New York, 1985, herein incorporated by reference.

The linking operation allows each node to have only a small amount of information aboard about the entire network. Basically, that information is limited to that about an address or identifier of a next node (successor) in the network, and a node count. The node count is the number of active nodes counted on the network during polling.

The expressions "polling", "network expansion", "network contraction", "network healing", "node counting", "network defragmentation", "network fragmentation", "network timer staggering", "network startup" are all explained in more detail in the paragraphs below. See, e.g., the appropriate paragraph headings.

For the purpose of token propagation, the network of the invention is functionally organized typically as a logical sequence of nodes, e.g., a chain or a ring of nodes. Each active node needs only know the identity of its immediate successor in the linked-node network, i.e., the nodes are organized similar to cells in a forward-linked list. The protocol implemented on each node examines or polls the network for the presence of active nodes by propagating a polling message or token over the linking configuration. If the token returns within a specified time, the network is intact. If the token fails to return, the network may have one or more breaks and is to be repaired or relinked. A break occurs, for example, when one or more active nodes have gone inactive. Although the protocol is designed to poll in a node-by-node fashion, the protocol supports general message broadcasting routines as well. General broadcast routines may be utilized by the protocol for adding and removing nodes and for healing and defragmenting a linked-node network during polling operations.

Polling

The protocol enables a node to receive a polling token or message from a predecessor node and to send the polling token to a successor node. The operation of sending the token from node to node is referred to as propagating the token over the network. Below, the expression "current token holder" refers to the node that has just received a polling token and has not yet passed the token on to its successor node.

A polling timer is preferably used for testing whether the token returns within a specified period of time after having traversed the network. However, other equivalent procedures can be used as well. Thus, a current token holder sets a timer substantially simultaneously with passing on the polling token. If the polling token returns, it has propagated around the entire network. If the token returns to the node that sent it before the node's timer expires, the timer is reset concurrent with propagating a new token. As long as the token is received at each respective node before its respective timer expires, the network is intact. However, if a node timer expires, i.e., it is in a TIME-OUT condition, and the polling token has not returned, the protocol initiates network healing. This is explained further below in the text portion with the subtitle "network Healing".

Network Expansion

Network expansion can occur in several manners. For example, a single node or another network is added to an existing network. If a single new node indicates it wants to join the network, the protocol must first be installed on the new node and the new node thrust be connected to the network. The new node then broadcasts an "add-me" message, e.g., over or onto the network or, alternatively, via another communication means. This message is a request to join, or to be linked into, the network. If the node was once a member of the network and wants to go active again, installation and connection have already occurred and the node must simply broadcast to rejoin the network.

To avoid the avalanche problems of the prior art, the protocol is designed to give the current token holder special privileges. One such special privilege is to respond to "add-me" broadcasts. Only the current token holder has the privilege to respond to "add-me" broadcasts, even though the broadcast is received by all nodes in the network.

In the adoption process the new node becomes the successor of the adopting node, and the previous successor of the adopting node becomes the successor of the new node. If the adopting node is the current token holder, the adopting node is required to propagate a dummy token to suspend polling. However, the adopting node will generally not be the current token holder when the adoption process is completed. The reason for this is the following. The adopting node was the current token holder when the "add-me" broadcast was received. Almost always the adopting node will already have propagated the polling token before the adoption is completed, so that token polling and network expansion are not coupled.

In more detail, the adopting node sends an "offer-to-join" to the new node in response to receiving the "add-me" broadcast. The "offer-to-join" response includes the address of the current successor of the adopting node, the current timer value (network transit time) if the timer value was not set at installation, the current node count and, optionally, the current node counter value. Because the size of the network increases with the addition of nodes, the protocol may also cause the new node to propagate a specialized dummy token over the network to update network time-staggering. The new node can set appropriate update staggering flags in the polling token when it is the current token holder This enables updating the network timer staggering for the addition of a new node. For details on adding a new node, see the description of FIG. 4. For details on the staggering, see the text portion "Network Timer Staggering" further below.

If the "add-me" broadcast is the prelude to adding a node to a super network, the adoption process for an existing super network will link in a number of representative nodes to the super link. If the "add-me" broadcast is to create a super network from two or more sub networks, one or more nodes of each link (or sub-network) become a functional node of the super network. Generally, the networks of a super linked network are hierarchically arranged. For example, a level 0 link may represent the super link, while level 1 links may represent the two component sub-links, and level 2 are sub-links of a sub-link, etc. For more details on a super network, see under FIGS. 1C and 7B.

If the network is a super network, an "add-me" broadcast will be received by more than one current token holder. Each sub-link has its individual polling token, and the super network has also its own polling token. Preferably, the super network is arranged in a hierarchy. Imagine each network has a hierarchical level associated with it. In the beginning, there's a single network, at level 0. If the network gets to a size where token transit time is not sufficient to accommodate the growing number of nodes, the network will have some stability problems or invokes healing too often. Therefore, the network will fragment, or divide, into multiple networks. For example, the original network fragments into two networks at level 0 and another at level 1. Assume that a node that is not part of any network broadcasts a request to join a level 0 network, and only the current token holders of level 0 networks respond. Each responding current token holder includes its current node count in its response. The new node can then pick the smallest network for the purpose of adoption so that node balancing of the networks occurs automatically. If a network needs to split again, there will not be a need to generate another level 1 network, just broadcast a 'join' request for level 1 networks. Thus, if a new link wants to join a super network, the broadcast message would be to the level 1 network and a set of representative nodes would be linked into the super network at level 1. See the description under FIG. 7C.

In this fashion, any node can be a member of more than one network, provided each one has a different level. See, e.g., under FIG. 1C. The super network preferably has multiple members, which are also members of particular sub-networks limiting or avoiding single point of failure problems, i.e., one node that can disconnect an entire sub-network from the super network by failing. Leveling the networks of a super network allows all processes described herein to be applied at each distinct level (healing of networks, merging, etc.) without concern.

Network Contraction

If a node goes inactive, it sets a field and/or flags in the polling token containing its node address and its successor's address. Alternatively, it broadcasts a "remove-me" message over the network or another communication means. The message contains the address of the node that is about to go inactive and the address of its current successor. If broadcast is used, the current token holder sets a "remove node" flag in the polling token and places the addresses in the polling token. As the token propagates around the network, the "remove node" flag causes each respective node, when it assumes the state of "current token holder", to check if its respective successor is the departing node. The "remove me" flag further causes the current token holder to release any resources associated with the departing node that the former may be currently using or any resources associated with the current token holder that have been available to the departing node. If the successor of the current token holder is the departing node, the current token holder resets the "remove node" flag, updates its successor node address with the address of the successor of the departing node, sets an "adjust staggering" flag and propagates the polling token.

Network Healing

As polling continues, the network will be stable and connected until a node becomes inactive after the last polling cycle. When a node goes inactive, it will not pass on the polling token to its successor. All subsequent nodes that are downstream of the inactive node, therefore, will not receive the polling token prior to the expiration of their polling timers. As a result a TIME-OUT condition occurs. Thus, a TIME-OUT condition at a node indicates a break in the network. The timers expire in the order of the network before it was broken because of the staggering of the timers. Therefore, the first polling timer to expire will be associated with the node immediately after the break. Once a TIME-OUT condition occurs, the protocol initiates network healing from the TIME-OUT node. The healing routines or sub-system will stitch, relink or heal the network.

Generally, the polling protocol provides each node with the address of its successor and with routines to add new nodes, heal network breaks and defragment a fragmented network. The protocol can also be designed to include optional information either residing on each node or in token fields associated with the token. This additional information can aid in simple healing processes by including addresses of the predecessor of each node, the predecessor of the predecessor, the successor of each node and the successor of the successor. Additionally, the token can include timer-adjusting fields and resource-sharing fields. The timer-adjusting information can be used to bring the network into a stable condition after node addition, node deletion, network healing, or network defragmentation as described more fully herein.

The invention further provides a method for curing, healing or repairing breaks in the network when a TIME-OUT condition occurs at a node during a polling cycle showing that one or more active nodes have gone inactive. The method includes propagating a relink message forward over the network from the TIME-OUT node (TON) concurrent with setting of a successor response timer (SRT). The relink token or message includes a field containing an address of the TON and a field containing a predecessor address, which is the TON address initially, but which is updated as the relink token propagates from node to node. Each successor node receiving the relink token deactivates its polling timer (PT) or suspends monitoring its PT, activates its SRT, sends a response to its predecessor (the sending node) acknowledging receipt of the relink token or message, and propagates the relink message to its successor. Besides suspending network polling, the relink message may suspend any other network activities, such as adding or deleting nodes, until the network is relinked.

Once the relink message is forwarded, each node awaits an acknowledgment from its successor. If a node receives an acknowledgment, the node deactivates its SRT and waits for the next polling token or specialized restart token to arrive. If a node's SRT times out or posts a TIME-OUT condition (i.e., its successor does not respond to the break message), the node (SRTTON) can reset its SRT and resend the relink message to its successor to ensure non-response. Once a single or repeat SRT time out has occurred, the SRTTON updates its successor address with the TON address. At this point, the SRTTON can become the current token holder or can send a message to the TON that relinking has occurred and the TON will become the current token holder. Either way, the current token holder can either restart network polling or propagate a special restart token forward. Start and restart tokens and the procedures for staggering the timers of the network are discussed more fully herein.

Node Counting

Once the current token holder restarts polling, it also zeroes the node counter. This makes calculating or tracking the number of active nodes in the network meaningless until the polling token has made one complete circuit of the network. Generally, node counting involves a node counter (NC) stored in a field associated with the polling token and a count value (CV) residing at each node and a calculated number NoC that represents the current number of nodes in the network. When the network first starts up or when a dummy token is propagated over the network to suspend polling, NC is set to 0 (or to 1, depending on whether the node that initialized the token is counted at the start or at the end of the token's tour), each CV is set to 0 and each NoC is set to 0 and preferably a "CV invalid" flag is set to a TRUE condition. As the polling, startup token or dummy token then propagates over the network, each node bumps or increments NC by 1 (NC:=NC+1) and the "CV invalid" flag is checked. If the flag is true, the node sets its "CV invalid flag" to a FALSE condition. If the "CV invalid" flag is false, the node calculates a difference NoC between NC and its CV (NoC=NC−CV). Regardless of the state of the "CV invalid" flag, the node then replaces its CV with NC.

The next time the polling token comes to a node (after another cycle), NoC represents the number of nodes in the network. NC is preferably a reasonably large number on the order of one byte (8 bits) long, preferably one word (16 bits) long and particularly a double word (32 bits) long. NC must be large enough to accommodate the size of the network. After a number of cycles, NC exceeds the physical size limit of its bit field and an overflow condition occurs. Subsequent nodes detect the overflow by checking if the value of the NC is smaller than the value of CV stored last time. If this is so, the (NoC=NC−CV) calculation is adjusted to account for the overflow of NC. There are several well-known methods to accomplish this, all known to the skilled artisan.

Network Defragmentation

After relinking the network, the current token holder should also check for network fragmentation. If the relink token includes a node counter which is incremented when a successor response is received, the token holder can check to see how many nodes dropped off the network by subtracting its last NoC value from the relink counter. If the absolute value of the difference is greater than unity, there is a possibility that the network is fragmented and a defragmentation procedure should be invoked by the current token holder. Fragmentation occurs when two or more non-neighbor nodes go inactive (drop off the network) during a polling cycle, because the healing process described above will result in the formation of two or more isolated networks.

One preferred procedure to cure fragmentation is for the current token holder to broadcast an "I have a token" message over the entire network. Because fragmentation means that more than one node will be a current token holder, the other current token holders receiving the "I have a token" message will know that the network has been fragmented and needs to be defragmented. The "I have a token" broadcast includes the address of the current token holder (CTH0) which sent the broadcast. A receiving current token holder (CTH1) sends a response back to CTH0 containing the address of its successor node (S1). The CTH0 node adopts S1 as its successor and sends its successor address (S0) to CTH1. The latter adopts S0 as its successor.

This process is easily extended. Thus, if a second current token holder, CTH2, having a successor S2, also responds, CTH0 adopts S2 as its successor and sends CTH2 the address of its current successor S1. CTH2 then adopts S1 as its successor. This process can be logically extended to handle linking or relinking any number of sub-networks into a larger network.

Because this process could take more than $1/n^{th}$ the network transit-time, there is a possibility that polling timers associated with the CTH0 fragment nodes time out and initiate a healing process before defragmentation is completed. To avoid the initiation of network healing during defragmentation, the CTH1 site propagates a dummy token using its new successor S0, i.e., over the CTH0 fragment. The dummy token causes each node receiving the dummy token to either deactivate its PT and await a new polling token or, preferably, to set its timer period to a larger value such as a multiple of the transit time (e.g., 2 times the transit time). As a result the polling will restart even if there's a failure during the defragmentation process. The dummy token can also cause the protocol to suspend other protocol procedures such as adding, removing nodes, etc.

Once the dummy token has returned to CTH1, the latter will be the current token holder and will restart polling with a startup token, a polling token with an initiation flag set, so that during the first cycle or circuit of the polling token around the defragmented network, the nodes will either ignore its NoC or not calculate NoC and await the second cycle before having confidence in its NoC value. The startup token or restart token will also provide each node with information sufficient to evenly re-stagger the network timers so that a new, evenly staggered equilibrium can be established.

Similarly, other "network-wide" parameters can be calculated, but they need to be done in an "incremental" fashion at each node to work reliably. One mechanism is "scoring", where fields are set aside for a score value and node address. When each node receives the packet, it compares its current "score" (resource availability, load average, etc.) with that in the packet. If its values are higher, it overwrites the packet value with its own score and address. Another scheme is to place a node address and information request into the token, such as "send me a packet if you have this resource".

It should be recognized that the polling token and the dummy tokens can all be the same token with different flags set to inform the protocol residing on each node what type of an operation is to be performed. Thus, the token could include a set of flags or binary on/off bits which cause the protocol at each node to act in a specified manner. Suppose the token has a polling on/off bit. The active polling will then proceed only when the polling bit is on. Otherwise the token is a dummy token causing each node to suspend polling. Additionally, relinking after a break may be indicated by a relink bit. When the relink bit is on, network healing routines are to be executed at each node. This bit may cause suspension of active polling or the polling bit may be turned off as well. Of course, the broadcasting messages are not tokens, are more unique or task sensitive and are not of a generalized form. However, a general broadcast message with a protocol control bit sequence could be used as well.

Network Timer Staggering

A goal of the protocol is to balance the length of time a node failure goes unnoticed against the amount of network bandwidth consumed by the protocol. A short token resident time increases network bandwidth consumption by increasing token processing and decreases network break detection time when an active node goes inactive. Conversely, long token resident times decrease network bandwidth consumption, while increasing the time needed to detect a break in the network. The protocol is designed so that the token remains at each node for about $1/n^{th}$ the cycle time, where n is the number of active nodes.

The invention provides a method for adjusting the timer values at each node to create evenly staggered network operation. In preferred operation, the protocol attempts to even out the time the polling token packet sits at each node to be approximately $1/n^{th}$ of the network transit time, where n is the number of active nodes and the transit time is relatively large. Generally, the cycle time or transit time is set to a small number of seconds and chosen based on the response time required of the system (to notice dead nodes, return aggregate information, etc.).

In a stable network state, the time at which the timer expires on each node is staggered by approximately $1/n^{th}$ of the transit period, i.e., the PT of a node and the PT of its successor expire at moments in time that differ by approximately $1/n^{th}$ of the transit of cycle period. The polling token is forwarded when each node's PT expires if the token returns before PT's expiration. Otherwise, network healing is initiated. Thus, if the system designer considers 5 seconds to be a reasonable maximum period for the system to detect a problem, i.e., the average problem detection time is 2.5 seconds with 5 seconds being a worst-case scenario and there are 10 nodes on the network segment, once the network has settled, the token should sit at or reside at each node for approximately 500 milliseconds, less the inter-node transfer time.

One preferred process for ensuring even time-stagger requires that when a current node receives a token, it calculates the time left on its PT before expiration ($\Delta T_c$). The polling token includes a "time remaining" field designed to contain the value of $\Delta T_c$ which is updated by each next node when the polling token is received. The staggering process computes a difference, $\Delta\Delta T$ equal to $\Delta T_p$ (predecessor node) minus $\Delta T_c$ (current node). If $\Delta\Delta T$ is greater than, or equal to, zero the process merely awaits timer expiration and propagates the polling token forward. If $\Delta\Delta T$ is less than zero, the current node (current token holder) divides $\Delta\Delta T$ by a factor of, e.g., two and 'winds forward' its polling timer PT by that amount. As a result, the PT expires earlier and forwards the polling token earlier. The wind-forward is not a permanent change in the period of the timer, but is just an adjustment to dynamically correct the staggering of expiration times.

This adjustment by itself does not result in even staggering of the expiration times, but it sets up a procedure for the system to converge to the correct values. That is, timer staggering will tend to achieve an even staggering, where the polling token resident time is approximately $1/n^{th}$ the network transit time minus the inter-node transit time. Even timer staggering over the nodes makes for a more stable network environment. The process may take several laps around the network, but the system will eventually reach equilibrium.

Although a division factor of two is preferred, larger division factors can be used as well. For networks with larger numbers of nodes, a larger division factor may be preferable. However, smaller adjustments, i.e., dividing by a larger division factor, result in less overshoot, but may increase the time it takes for the network to converge.

The above procedure covers the steady-state operation of a network relating to node timer staggering, but network start up and restart conditions also need attention in order to set up a stable, known state from which to converge. If the network is not close to evenly staggered from the outset, there is a danger of timers expiring randomly and forcing unnecessary healing operations.

Network Startup

One preferred start-up or restart procedure is to propagate a dummy or start-up token over the network, where the token comprises two fields. A first field contains a value of an incremental time period. The incremental time period is the smallest value by which expiration times will be staggered. Typically, the incremental time period is a function of the expected worst-case responsiveness of nodes in the network. The time period should be comfortably larger than the worst-case time period for a node to receive a token, to process it, and to forward it, even under heavy load. The incremental time period can be determined by testing node token processing times under heavy load and simply multiplying this number by a factor greater than unity. Preferably, the factor should be greater than 1.2, particularly greater than 1.5 and especially, greater than 1.8. A second field contains a value for a cumulative time period, which is set to zero by the node propagating the dummy token over the network.

When a node receives the dummy token, it takes the cumulative period, adds it to the network transit time, and sets its timer to this value. It then adds the incremental period to the cumulative period, and immediately forwards the token to its successor. By this mechanism, the network is initially set up with minimum staggering between nodes, from which the mechanism above will converge to an appropriate equilibrium for the system.

When the node that initiated the dummy token receives it back, it can examine the cumulative period to ensure that it is safely under the network transit time. If it is larger, there are too many nodes included in this network to reliably sustain the desired network transit time. Mechanisms should then be invoked to split the network into two to create a super network joined between one or more nodes within each sub link.

This process is used after healing and defragmenting operations. When a new node is introduced into the network, the new node preferably sets its timer to be twice the network transit time initially, to the network transit time plus the incremental period when it first receives a token, and then to the network transit time from that point on. This introduces the node into the network at a minimum staggering, the node's successor will decrease its stagger by half the difference, maintaining valid staggering, and the system will start reconverging on a new equilibrium.

These procedures are designed to adjust the node timer values so that each node will retain token ownership for approximately $1/n^{th}$ the network transit time.

Network Fragmentation

Network fragmentation can occur by design or in response to too many nodes in a network to maintain a set transit period. Network fragmentation basically involves breaking the network into two or more sub-links and linking the sub-links together through one or more super-link nodes. If a network becomes too large, the protocol can simply halve the network into two approximately equal-sized sub-links. The current token holder would halve the network.

FIG. 1A is a block diagram of a first embodiment of this invention with a network 100 having a plurality of nodes 102 and a node 106. The network 100 is designed in this example as a logical ring. The ring does not have to be an actual physical layout of nodes. The diagram illustrates an abstract or logical node layout. Thus, it should be recognized that the nodes can be in different locations e.g., in different offices, buildings, cities, states or even in different countries. Moreover, the communication pathways connecting the nodes do not have to be in any particular arrangement provided that each node can communicate with its successor, and with all other active-nodes on the network in a broadcast fashion.

Each node 102, 106 has a copy of a polling protocol for propagating a polling token along communication pathways 104. The communication pathways 104 can be of any type of wired connections such as twisted pairs, coaxial cable, fiber optics, phone lines, DSN, T1, T2, T3 or the like, or any type of wireless connections such as IR, RF, microwave, laser, or any other electric, magnetic or electromagnetic wireless communication protocol. If all of the nodes 102, 106 are active the polling-token or token message propagates from node to node along pathways 104. Of course, when the protocol is first activated, one node, say node 106, will start the polling message propagation. The message will continue to propagate until a break in the logical ring occurs.

The polling protocol does not need maintaining a full inventory of active nodes. The memory requirements of the protocol at each node can therefore be kept relatively small. However, any node can request an inventory by sending an inventory packet around the ring independent of the polling token.

Figure 1B:
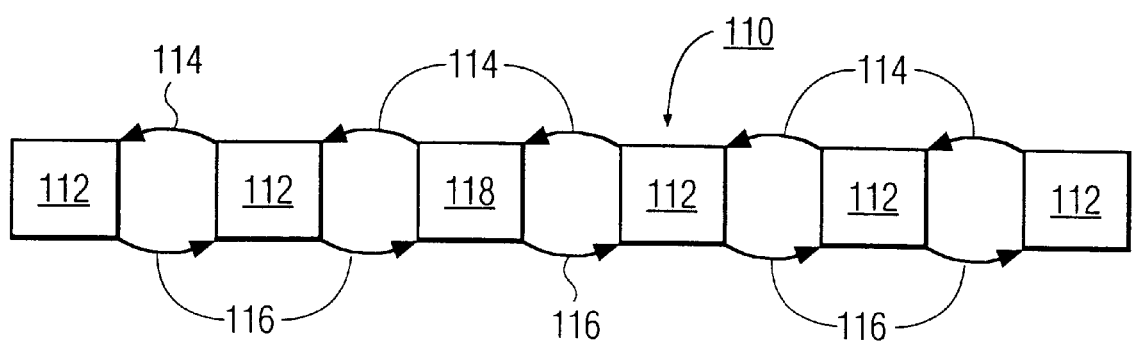

FIG. 1B is a block diagram of a second embodiment of a network of this invention including a network 110 having a plurality of nodes 112. The network 110 is designed as a logical chain. Each node 112, 118 has a copy of a polling protocol for propagating a polling token along forward pathways 114 and backward pathways 116. If all of the nodes 112, 118 are active the polling message will propagate along the chain until a break occurs. The chain configuration requires the protocol to have a forward successor address used with the forward pathways 114 and a backwards successor address used with the backwards pathways 116. Stated differently, each node 112, 118 has the address of its successor for use in forward propagation and the address of its predecessor for use in backward propagation. At the chain ends, the successor address and predecessor address is the same.

Figure 1C:
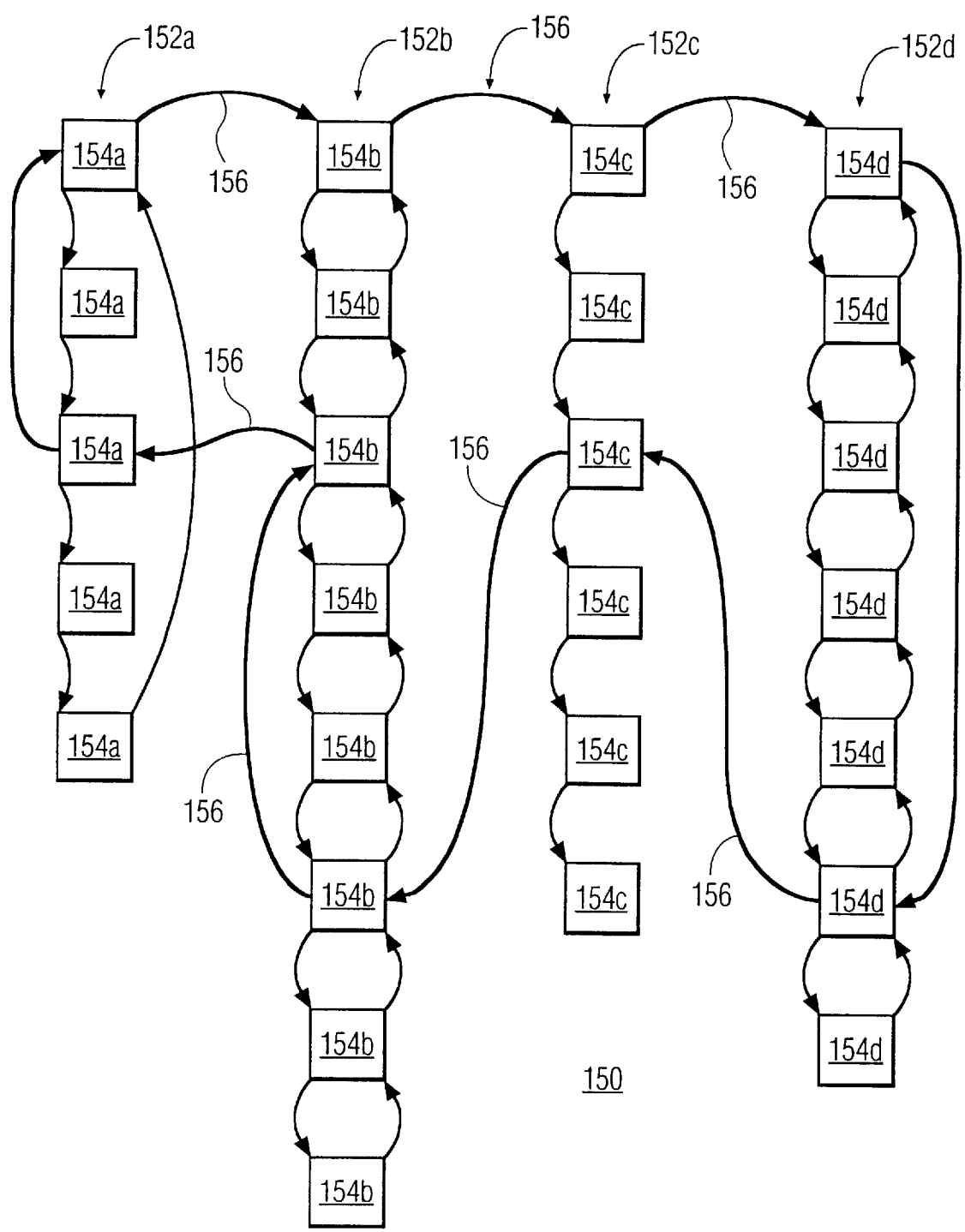

FIG. 1C is a block diagram of a super network 150 with a plurality of linked-node networks 152a–d. Each network 152a–d includes a plurality of nodes 154a–d, respectively. Super network 150 is constructed as, e.g., a logical ring, a chain or equivalent thereof. Super network 150 is formed by linking a plurality of respective nodes of each respective network 152a–d. These links are indicated as bold links 156. The polling protocol is implemented on the super network 150 so that associated polling tokens propagate over the super link as well as over each sub-link. The networks 152a–d do not have to be linked-node networks, although they are shown here as such. Each network 152a–d has its individual polling token. In addition, the protocol includes a super polling-token which propagates not only over the representative nodes, but over every node in the network or at least every node that has the protocol of the present invention implemented thereon. The super polling-token and the individual polling-tokens for the sub-links 152a–d can be arranged so that tokens have assigned priorities. The tokens are processed at each receiving node based on the priorities assigned or alternatively, e.g., concurrently handled or handled based on arrival time. The only requirement is that the protocol ensure that propagation occurs within the specified hold time for the relevant token at a given node to avoid false time-outs. Because a super network is considered hierarchically arranged, as shown for network 150, the protocol may handle token propagation based on the hierarchy. Thus, network tokens will be handled according to their levels in the hierarchy.

Figure 2A:
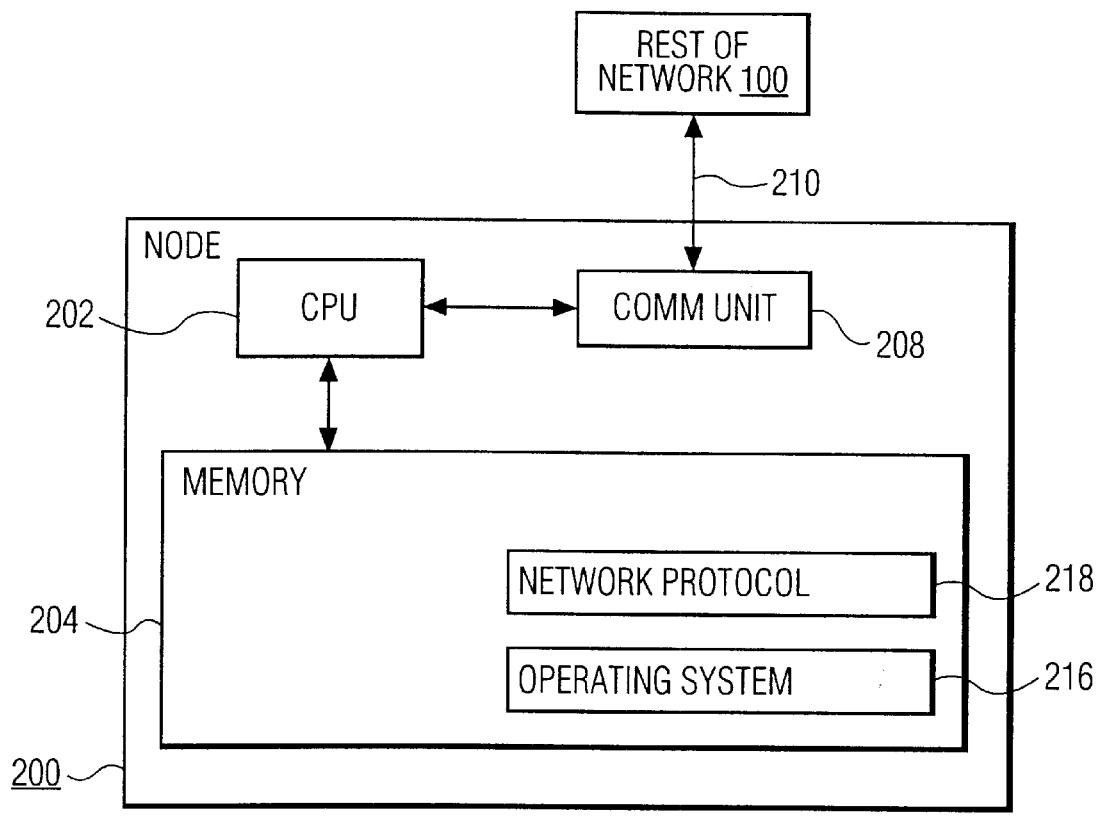
FIGS. 2A–B are block diagrams of a node for use in the networks of FIGS. 1A–C.

FIG. 2A is a first block diagram of a representative information processing node 200 in the networks of FIGS. 1A–C. Node 200 is, for example, a member of a multi-node data processing system and comprises a digital processing system with a CPU 202, a memory 204, and a communication unit 208 connected to the rest of network 100 via a communication link 210. Unit 208 is coupled to CPU 202. Memory 204 is coupled to CPU 202. All of the components of the node 200 are capable of communicating as needed under any hardware configuration or design. Node 200 further includes an operating system 216, and also a protocol system 218 according to the invention. Either resides in the memory 204. It should be recognized that the memory 204 can include any type of memory device accessible to the CPU 202 such as ROM or any variant thereof, RAM or any variant thereof, firmware, external mass storage devices such as a disk drive, tape drive, optical disk or the like or any other computer memory device.

Figure 2B:
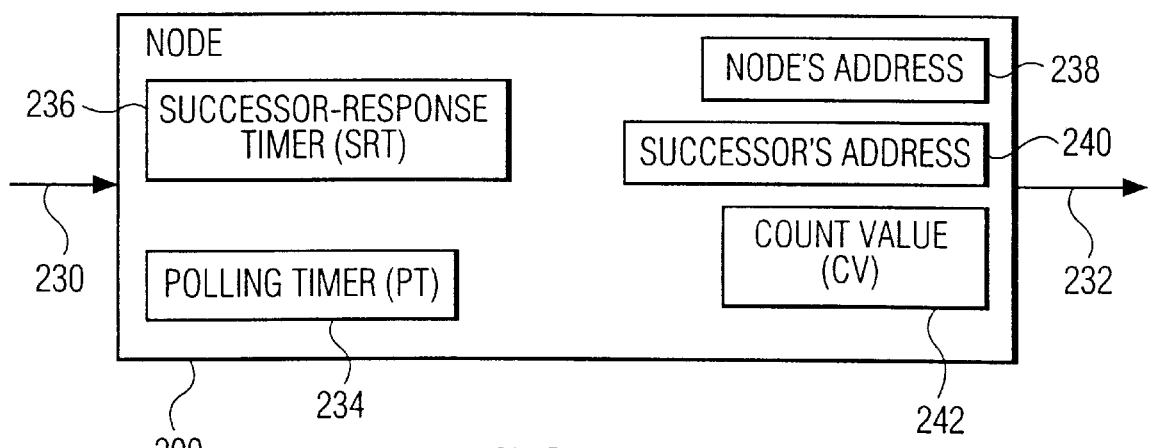

FIG. 2B is a second block diagram of node 200 with other functional components relevant to the network protocol in the invention. Node 200 has a token input 230 for receiving a token, and a token output 232 for supplying a token. Node 200 has a polling timer 234 whose function is explained, e.g., in the paragraph "Polling" above. Node 200 has a successor-response timer 236 whose function is discussed herein, e.g., in the paragraph with heading "Network Healing". Node 200 further comprises registers 238, 240 and 242 that store the node's address or identifier, the address of the successor to node 200 in the current network configuration, and the Count Value, respectively. For the meaning of Count Value, see, e.g., the paragraph under the heading "Node Counting". Functional components 232–242 can be implemented in hardware or be embedded as software functionalities in the configuration of FIG. 2A.

Figure 3:
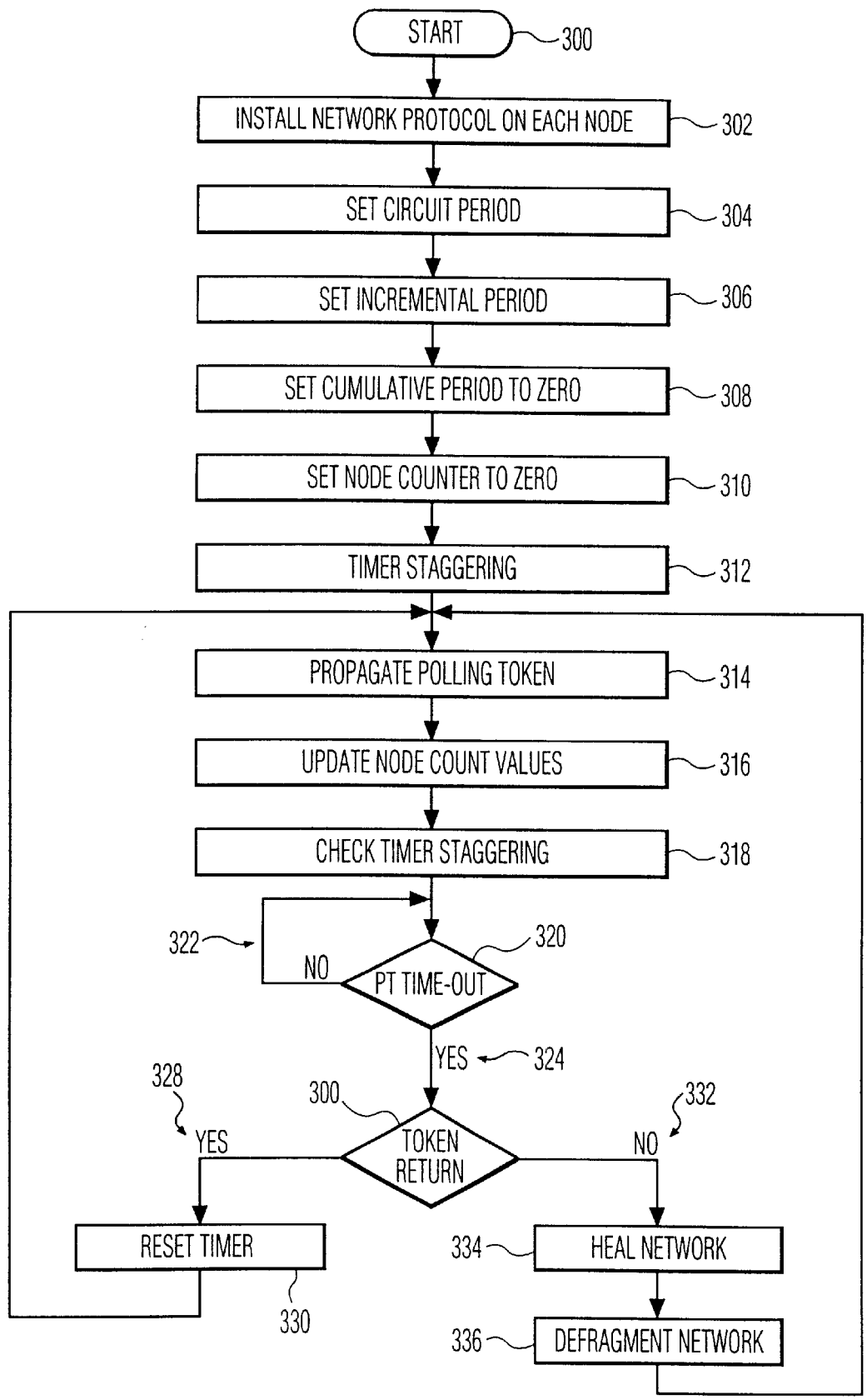
FIG. 3 is a flowchart of a polling protocol.

FIG. 3 is a flowchart illustrating steps in the polling protocol of this invention. The flowchart includes a start step 300 which transitions into an "install protocol" step 302. In step 302, the protocol is installed on each node that will eventually be a member of the network. The step 302 loads each node with a successor address and all associated protocol software. Addresses may be assigned by the installer. Many other methods of address assignment can be employed, see, e.g., U.S. Pat. No. 5,689,675 issued to Arnold Buij and Marcel Beij assigned to U.S. Philips Corp., and herewith incorporated by reference. This patent relates to a control system comprises modules, and control means to control assignment of addresses to the modules. Each particular module has a particular number, e.g., a random number). The control means iteratively determines which one of the modules has an extreme one among the particular numbers. Each module is stimulated to conditionally respond if its particular number lies within a certain range. The range is altered until the module with the extreme is found. This process is repeated for the next lower extreme until all modules have been validated. Addresses are then created and stored in the modules for access during operational use.

As a result of loading step 302, token propagation can be directly implemented when the network installation is completed. Next, the installer sets a number of network parameters. In step 304 an (estimated) circuit time period is set. A network increment period is set in step 306. A cumulative period is set to zero in step 308. The network node counter is set to zero in step 310.

The circuit time period, also referred to as transit time or cycle time, is a time period large enough for the polling token to propagate around the network without causing false time-outs from transit timers at each node during peak usage and with the protocol running in a background mode at each node. Typically, the transit time is on the order of several seconds, but as the number of nodes in a network increases so must the transit or cycle time for propagating the polling token over the network. At some point, the network may simply become too large. Under such conditions, the protocol can fragment the network into a hierarchical super network so that polling, node adding and removing, healing and defragmenting operations can proceed more efficiently. Next, control is transferred to a "timer staggering" step 312, described in greater detail below with reference to FIG. 8. After the staggering routines have executed, the protocol system proceeds to a "polling token propagation" step 314. Again, propagation is the process of sending a token node-by-node around the network similar to, e.g., chaining around a linked list in a cell-by-cell format. The first cycle around the network, either upon initial start-up or an adding, removing, healing or defragmenting process, is an introductory polling cycle. A reason for having an introductory polling cycle is that an accurate node count cannot be known initially. Certain other protocol procedures or network processes may not function until an accurate node count is established. An accurate node count is established after a second successful token propagation.

Once the polling token is propagated from a node to its successor node that has received it successfully, the successor node bumps (increments by unity) the node counter NC in the token, updates its counter value CV and computes the number of nodes NoC in step 316. If this is a start or restart cycle, NoC, which is the difference between NC and CV, is less then zero. This signifies to the protocol that an accurate node count will not be available for at least another complete or successful cycle.

Next, the system will check to ensure that the network is properly staggered in a "check timer staggering" step 318. Network staggering means that the token resides at each node for about $1/n^{th}$ the network transit or cycle time where n is the number of nodes in the network. The routines associated with checking timer staggering are designed to ensure that the network will progress to an evenly staggered state over time after startup or restart following other protocol operations. The process for achieving even staggering is detailed with reference to FIG. 7A below.

Next, the system tests for a TIME-OUT condition in a polling timer PT of the node in conditional or logical branching step 320. If time-out has not yet occurred, the system continues to monitor PT as shown in a "NO"-branch 322, which transfers control back to conditional step 320. If the PT has timed out, control is transferred along a "YES"-branch 324 to a token return conditional step 326. The step 326 checks to see if the polling token returned prior to PT time-out. If the token returned prior to PT time out, control is transferred along a "YES"-branch 328 to a "reset PT" step 330 and back to the "propagate" step 314. If on the other hand, the polling token did not return prior to PT time out, control is transferred along a "NO"-branch 332 to a "heal network" step 334. Step 334 includes the healing subsystem described in more detail herein. After healing, the system preferably transfers control to a "defragment network" step 336. Step 336 includes the sub-system for defragmenting the network described in greater detail herein.

Although defragmentation is shown here to occur after network healing, the defragmentation process can be, and preferably is, performed by the system on a more regular basis to ensure that the network does not have more than one polling token propagating around the network. Of course, for super networks, healing and defragmentation can occur on the super ring or on any sub-ring depending on the layout of the super network. The process for healing and defragmentation carried out on super networks is handled using the hierarchical information associated with each network. Preferably, each sub-link has an unique identifier that allows healing and defragmentation to occur only over the identified network in which a PT time out has occurred. Note that an active network is identified as a path along which a corresponding token travels. A node can be a member to multiple networks, see e.g., FIG. 1C and its description.

Figure 4:
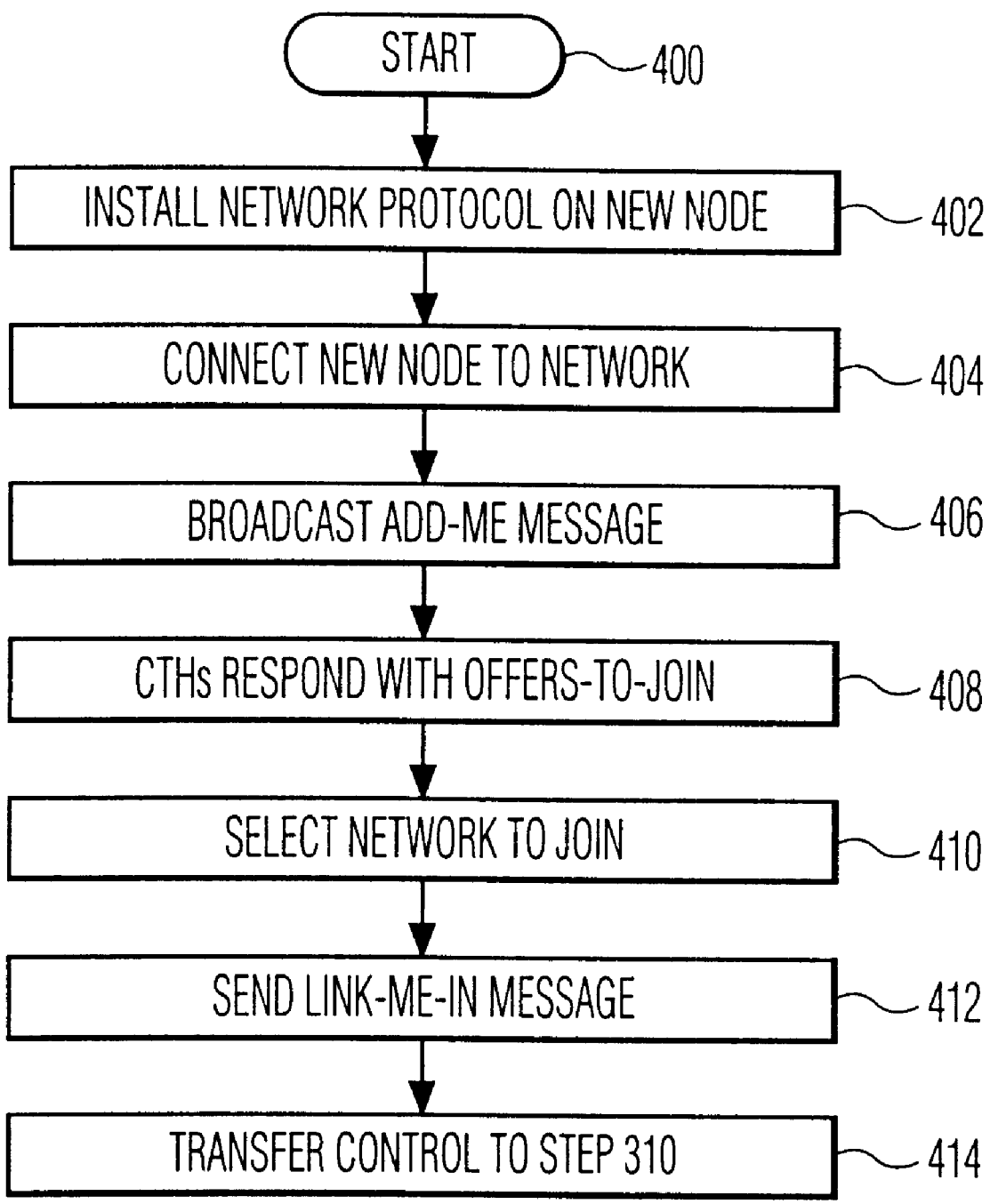
FIG. 4 is a flowchart of adding a new node to a network.

FIG. 4 is a flowchart with process steps of adding a new node to an existing network. Upon an arbitrary or nominal start step 400 the process transitions into an "install network protocol" step 402. Once the protocol is installed on the new node, the new node is connected to the network in a "network connection" step 404. Next, the sub-system for adding a new node causes the new node to broadcast a "new member"-or "add-me"-message in step 406. The "add-me"-broadcast includes the new member's address or identifier. If the new member was a previous member of the network, steps 402 and 404 can be skipped.

Although the "add-me"-broadcast is generally received by all nodes, only current token holders (CTHs) can respond to "add-me"-broadcasts in "respond"step 408. Each CTH sends an "offer-to-join"-message to the node that has sent the "add-me"-message. The "add-me"-node can then select which network to join in "select network" step 410. The sub-system for adding a new member does not interfere with network polling so that the process of adding the new member may proceed after the responding node no longer is a current token holder as explained.

Once the new node has selected a particular network to join, the new node sends a "link-me-in" message to the adopting node of the selected network in a step 412. The adopting node is the one that responded to the "add-me"-broadcast in the selected network. The "link-me-in"-message causes the adopting node to link the new node into the selected network. The linking process involves replacing the adopting node's successor address with the new node's address and setting the new member's successor address to the adopting node's successor address that was valid prior to adoption. The address information can be transmitted with the "add-me"-broadcast, the "offers-to-join" and/or the "link-me-in"-message or in subsequent communications. Next, control is transferred back to step 310 in a transfer step 414 in order to start the polling of step 314. At this point, the node that restarts polling can modify the cycle time by an incremental amount placing the new information in the polling token with an instruction for each subsequent node to update its PT period. Staggering adjustment will be handled in step 318 as described herein.

Figure 5:
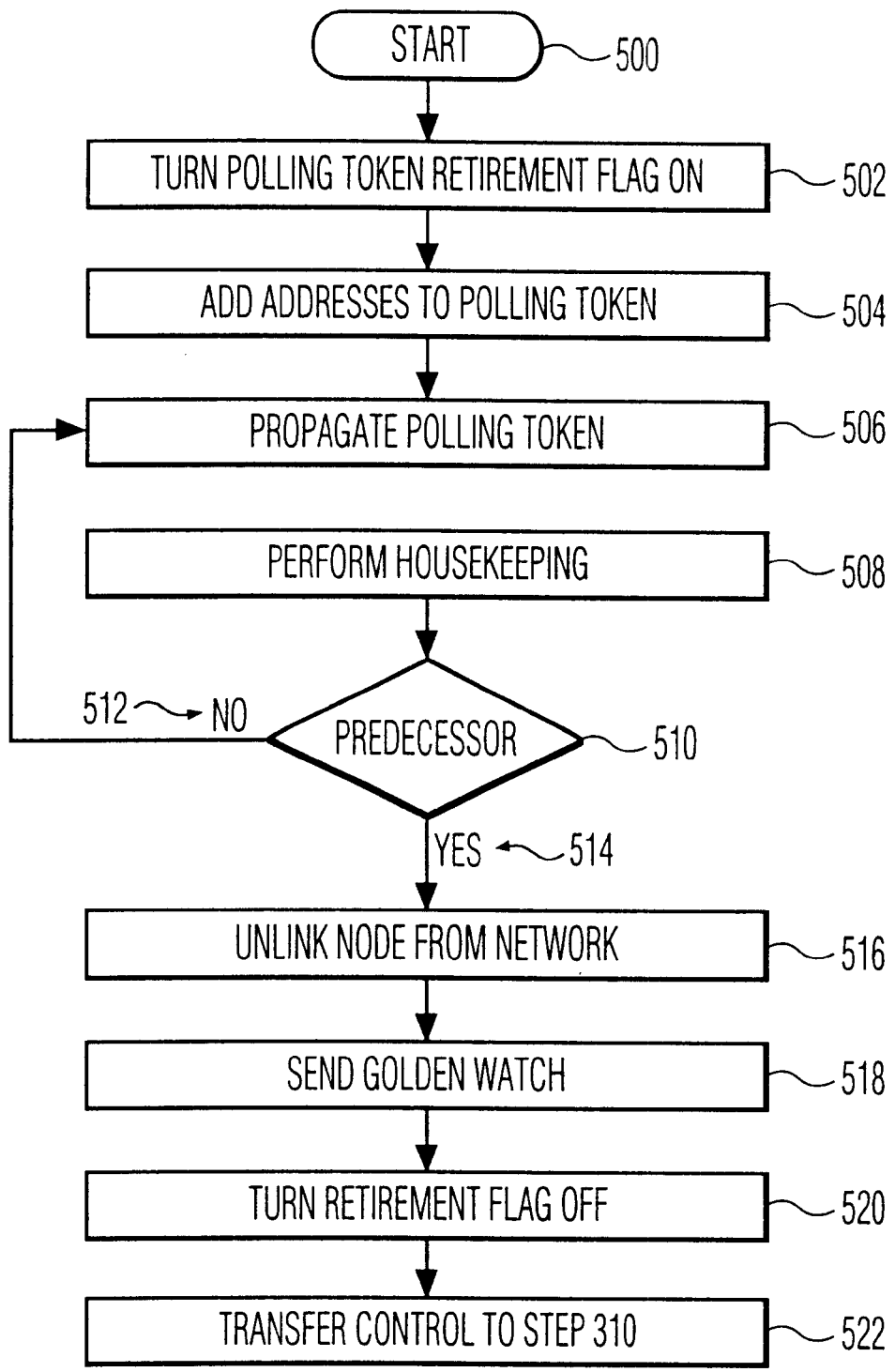
FIG. 5 is a flowchart of removing an active node from a network.

FIG. 5 is a flowchart with steps for removing a node from an existing network. The flowchart starts with a nominal start step 500. The retiring node sets a retirement flag in the polling token in a step 502. The retiring node then adds its address and an address of its successor to appropriate fields of the polling token in a step 504. The retiring node then propagates the polling token with the retirement flag set forward in a propagation step 506. As the polling token propagates around the network, each receiving node is notified that a node is retiring because the retirement flag in the token is set. In a "house-keeping" step 508, the receiving node prepares to take appropriate measures for closing any open connections with the departing node, for releasing any shared resources, and/or for performing any other housecleaning operations needed to cut the bonds with the departing node. In a conditional step 510, each receiving node checks to see if it itself is the predecessor of the retiring node. If the receiving node is not the predecessor of the retiring node, control is transferred along "NO"-branch 512 back to step 506. If the receiving node is the predecessor of the retiring node, control is transferred along a "YES"-branch 514 to an "un-link retiring node" step 516. In step 516, the address of the retiring node is replaced with the address of the successor of the retiring node as it was prior to the latter's departure. Next, the receiving node sends a "golden watch" packet to the retiring node in a golden handshake step 518. This informs the retiring node it may enter retirement gracefully. Then, the receiving node sets the retirement flag to "off" in a "flag off" step 520. Control is then transferred in a transfer step 522 to step 310 to restart polling. At this point, the node that restarts polling can modify the cycle time by an decremental amount by placing the new information in the polling token with an instruction for each subsequent node to update its PT period. Staggering adjustment is handled in step 318 as described herein.

Figure 6:
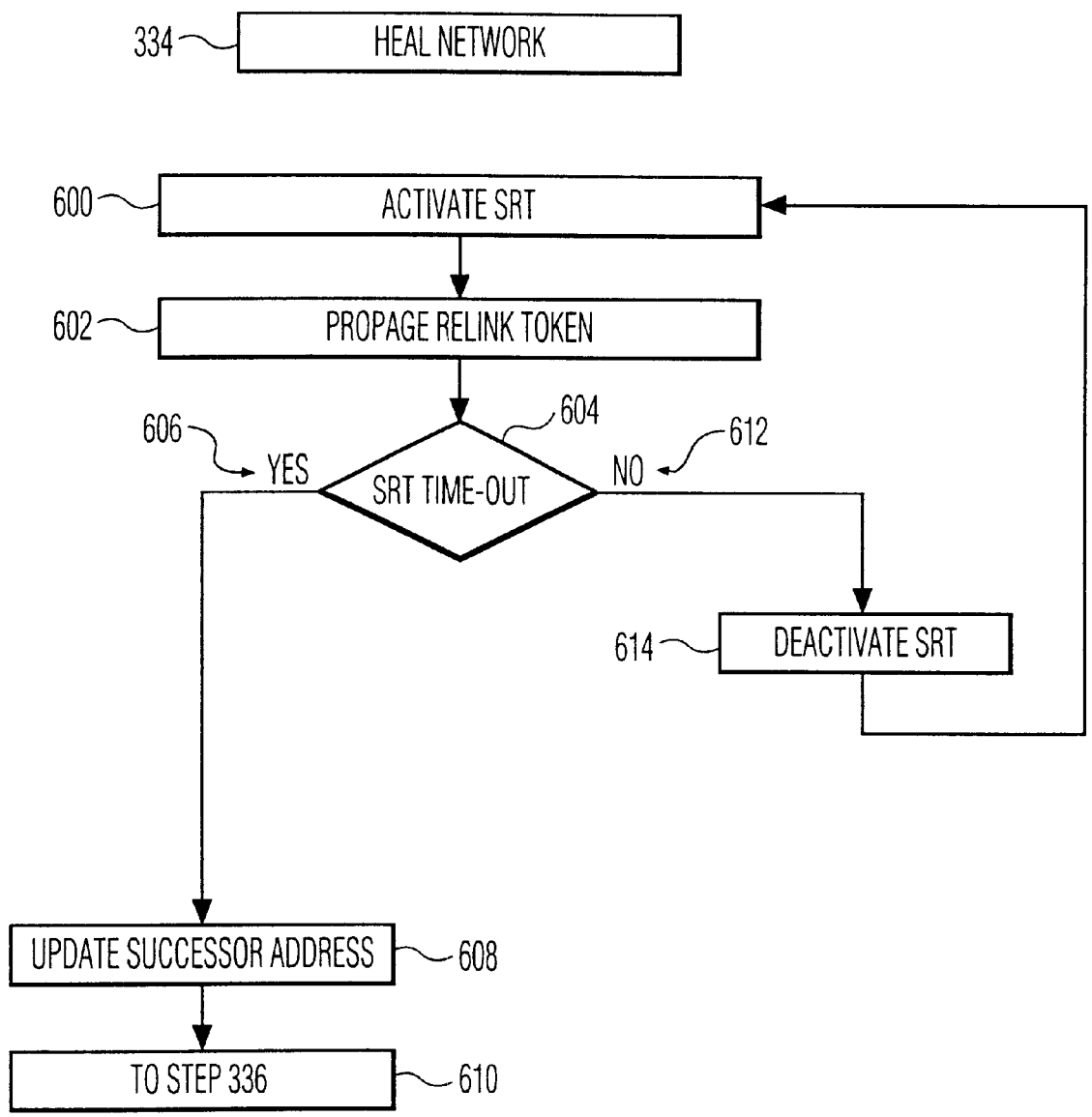
FIG. 6 is a flowchart of repairing a break in a network.

FIG. 6 is a flowchart with process steps illustrating healing of the network, as referred to in step 334 of FIG. 3. The process includes propagating a relink message forward in propagation step 602. The relink message includes the address of the TIME-OUT node, i.e., the address of the node whose PT timed out before it received the polling token from its predecessor. The relink message causes each node that receives it to suspend PT monitoring until a new polling token is received. Simultaneously with propagation of the relink message, each node sending the message activates a successor response timer (SRT) in step 600. The sub-system for healing the network then monitors the SRT in conditional-branch step 604. If the monitoring step 604 detects a TIME-OUT condition, control is forwarded along a "YES"-branch 606 to an "address update"step 608. In step 608 the successor address of the node, whose SRT timed out, is updated with the address of the TIME-OUT node whose PT timed out. A reason for a node's SRT to time out is that it did not receive a response from its successor when it propagated (forwarded) the relink token to its successor. That is, its successor became inactive after the last cycle. In a transfer step 610 control is then transferred to defrag step 336 in FIG. 3. Alternatively, the protocol can skip the defrag step 336 and transfer control to step 314 so polling can be restarted. This alternative may be invoked if the defrag process is performed at some regular interval. For example, the process is performed by having a defrag counter embedded in the polling token. As a result, every $i^{th}$ cycle (when the defrag counter has a value of i), the current token holder will test for fragmentation.

If a node receives a response from its successor upon sending the relink token, the SRT time-out monitoring step 604 will transfer control along a "NO"-branch 612 to a step 614 for deactivating the SRT. Control is returned to 600 for resetting and activating the SRT.

When two non-neighbor nodes drop out of a network, the healing process causes healing to two or more fragments or sub-networks. Because these sub-links have no knowledge of each other, a process must be used to tackle this problem. One such procedure is for each node to know the address of its immediate successor and the address of the successor of its immediate successor. Knowing these two nodes ahead provides implementation of methods to send the polling token to the successor's successor if only one node has gone inactive. Of course, this procedure does not cure or heal situations where a cluster or group of devices go inactive at one time, such as a group of nodes on a single power strip that has been turned off. Therefore, a more general defragmentation process is preferably utilized. One such process is set forth below.

Figure 7A:
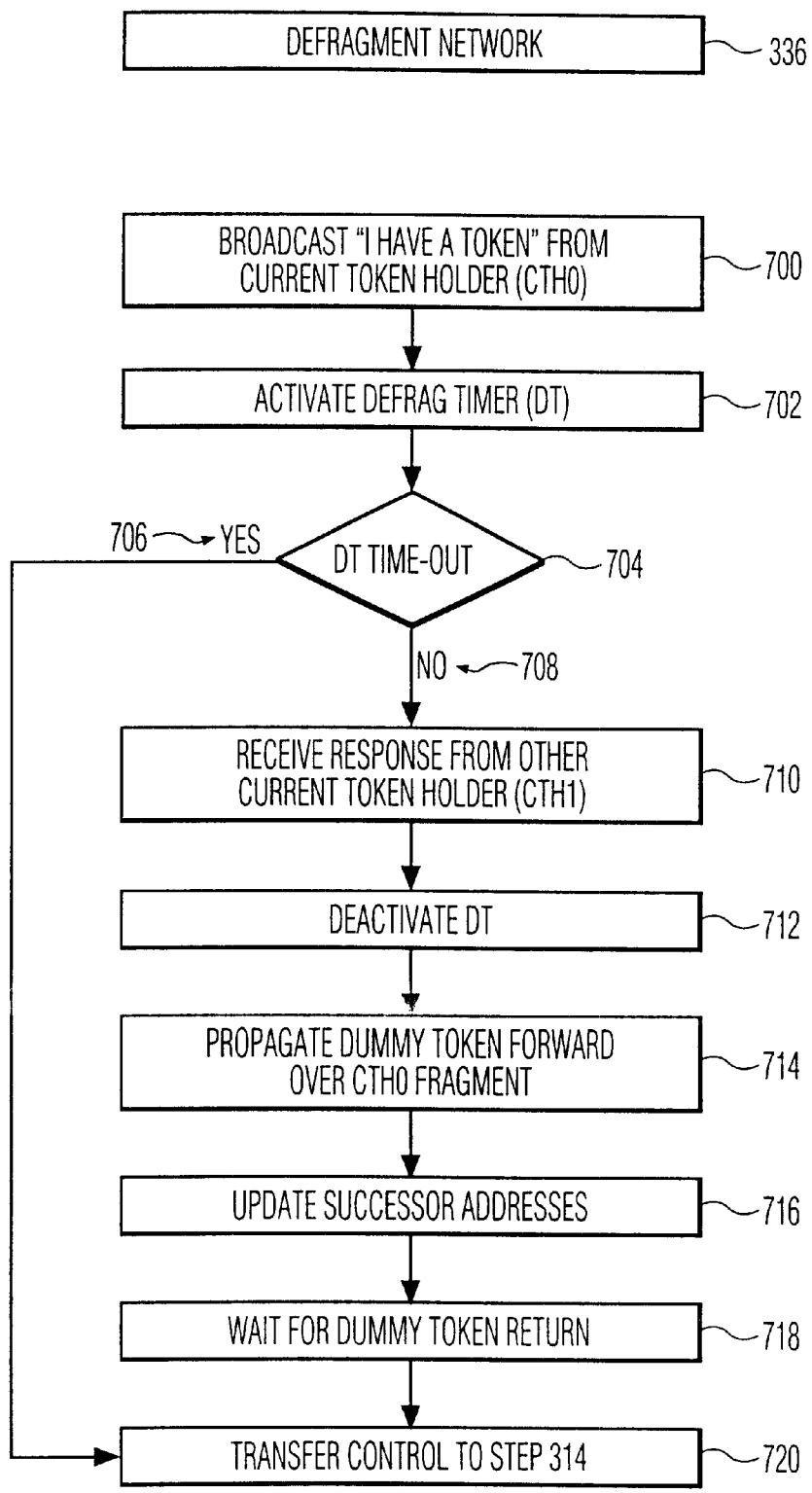
FIG. 7A is a flowchart of network defragmenting.

FIG. 7A is a flowchart with steps of the defragmentation process 336. The flowchart starts with a broadcast step 700 wherein a current token holder (CTH0) broadcasts an "I have a token" (IHAT) message. The broadcast includes CTH0's address and. the address of its successor. Concurrent with broadcasting the IHAT message, the protocol activates a defrag timer (DT) in a step 702. The protocol then monitors for a response to the IHAT message in a conditional branch step 704. The only nodes that are permitted to respond to such a message are other current token holders. Other current token holders would exist if two or more non-neighbor nodes dropped off the network during a polling cycle and the healing procedure set forth above relinked the network. If only one node has gone inactive, the DT would time out and control would be transferred along a "YES" path 706 to a "transfer control" step 720. Step 720 transfers control back to step 314 for continued polling, because the network was completely relinked via the subsystem for healing the network.

If a response to the IHAT message is received from another current token holder (CTH1), control is transferred along a "NO"-branch 708 to a step 710. In step 710, the response is received from CTH1. The response includes the addresses of CTH1 and of its successor. Upon response from CTH1, the DT is set to an "OFF" condition in a step 712. To avoid possible PT time-outs occurring at nodes in each sub-link during the defragmentation process, CTH1 propagates a dummy token to CTH0's successor in a propagation step 714. The dummy token instructs all nodes to set their PT timer to a large value so they will not time-out prematurely, i.e., before a new polling token is received. The propagation proceeds from CTH1 to CTH0's successor. A reason for this is that PT associated with the CTH0 sub-link will be more likely to expire than the nodes associated with the CTH1 sub-link in the short run. Another reason is because the dummy token progressing around the entire relinked network is started from CTH1 instead of CTH0. The dummy token can be propagated by either one or both of CTH0 and CTH1.

After propagating the dummy token over the network, CTH0 and CTH1 exchange successor addresses in an update step,716. CTH1 then awaits return of the dummy token in a wait step 718 and in a transfer step 720 either CTH0 or CTH1 transfers control to step 314.

Figure 7B:
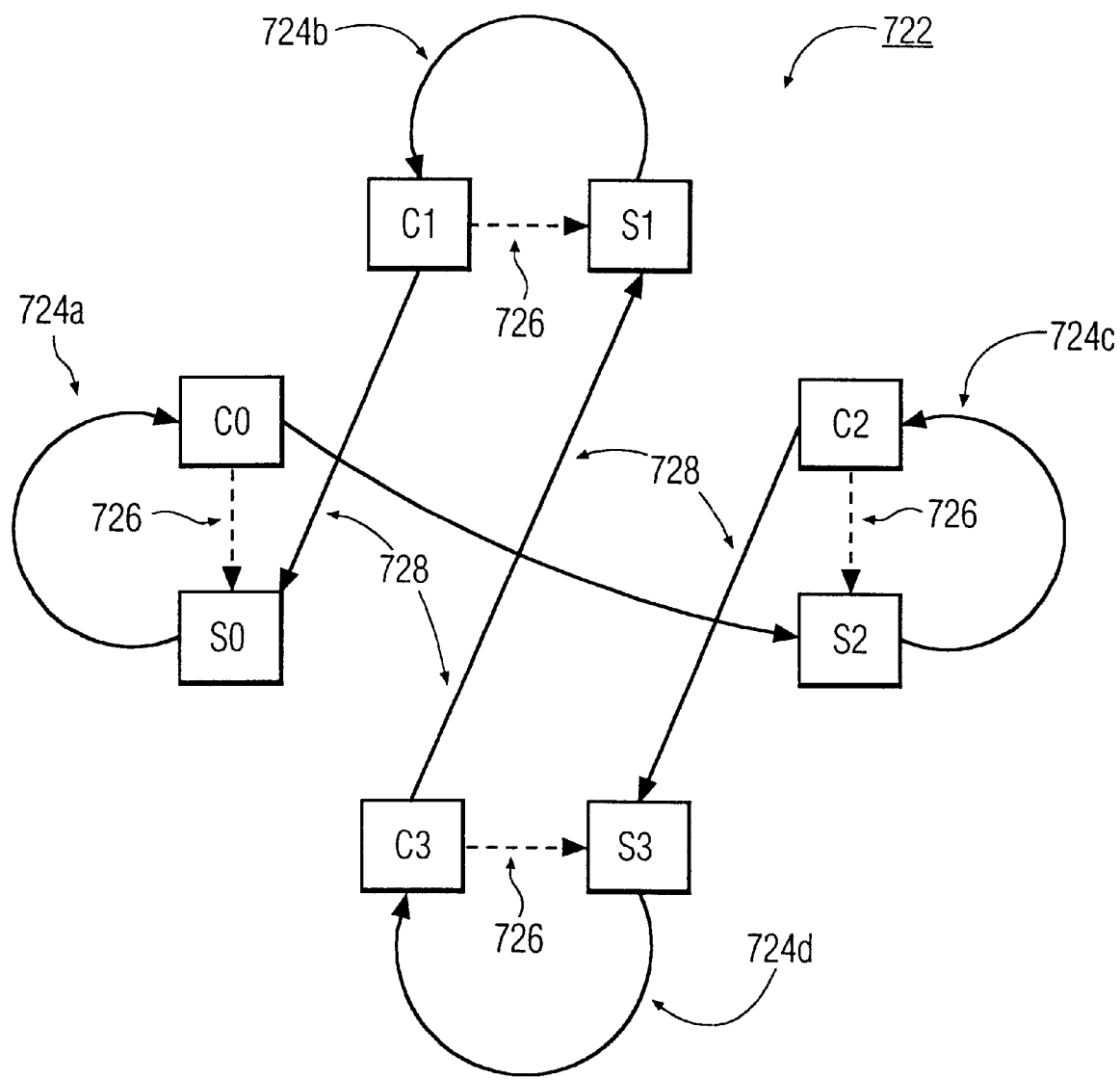
FIG. 7B is a diagram of relinking a network that has fragmented into four sub-networks during healing.

FIG. 7B is a diagram that depicts relinking a network .722 that is fragmented into four sub networks 724*a*–*d*. Fragment 724*a* has current token holder C0 and its successor S0. Fragment 724*b* has current token holder C1 and its successor S1. Fragment 724*c* has current token holder C2 and its successor S2. Fragment 724*d* has current token holder C3 and its successor S3. During the defragmentation process, successor links 726 (dashed lines) are replaced by new successor links 728 (bold lines). Because of the order in which each current token holder responded to the IHAT message from C0, token holder C0 becomes linked to S2, C1 becomes linked to S0, C2 becomes linked to S3 and C4 becomes linked to S1.

Figure 8:
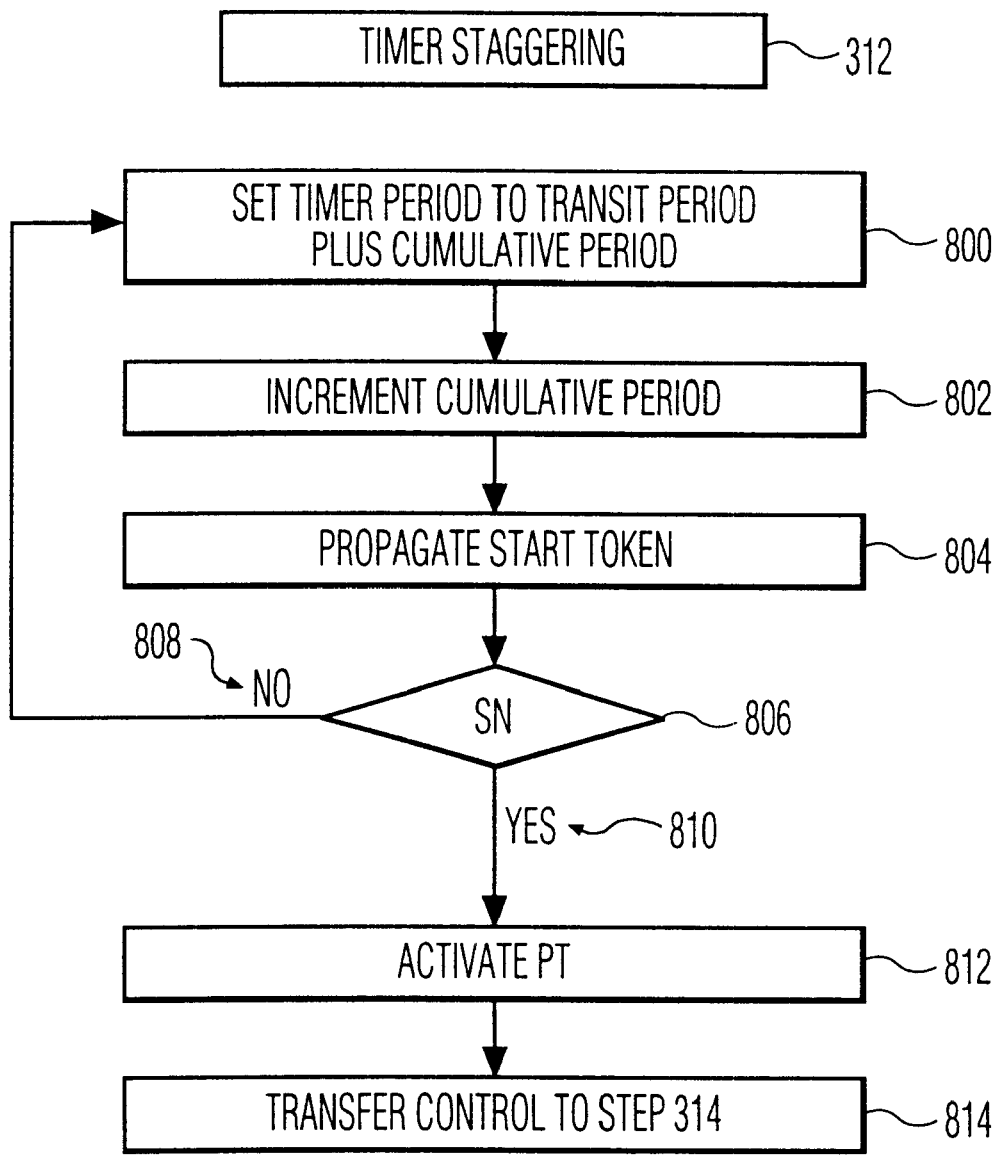
FIG. 8 is a flowchart of initial node-staggering a network.

FIG. 8 is a flowchart with steps of the initial node-staggering sub-system 312. In a set-timer step 800 the timer of the current node is set to the transit time plus the incremental time, both contained in a dummy or start-up token. After the sub-system sets the timer of the current node, the sub-system increments the cumulative period in the token in an increment step 802 and forwards the token to its successor in a step 804. Note that general polling is not occurring and that only the initial node-timer-staggering is being established. Next, the sub-system checks in a conditional branch step 806 to see if the dummy, start or restart token, has completed a full cycle, i.e., has arrived back at the start node, SN If the current node is not the start node, control is transferred along a "NO"-branch 808 to step 800. If the current node is SN, control is transferred along a "YES"-branch 810 to a step 812 wherein PT is activated. After SN activates PT, control is transferred to step 314 in a transfer step 814.

Figure 9:
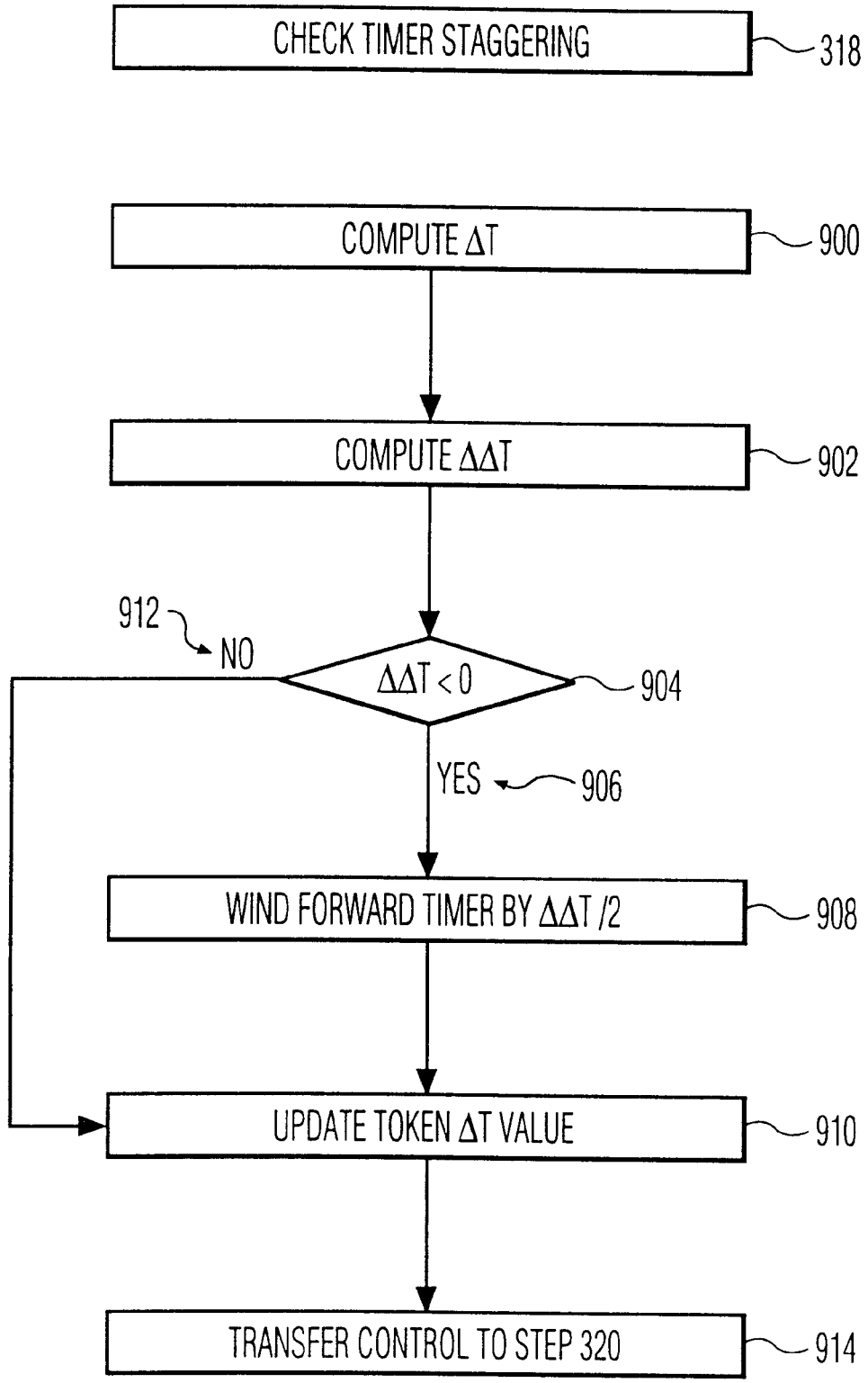
FIG. 9 is a flowchart of balancing node-staggering in a network.

FIG. 9 is a flowchart with steps of the sub-system 318 that checks timer staggering. In compute step 900 the sub-system calculates the time ($\Delta T_c$) remaining on the polling timer (PT) of the current node upon receipt of the polling token. Next, the sub-system computes in a second compute step 902 a quantity $\Delta\Delta T$, which is a difference between $\Delta T_c$ and a time period remaining ($\Delta T_p$) in the timer (PT) of the preceding node. This quantity $\Delta T_p$ was stored in a field in the token by the preceding node. If the difference $\Delta\Delta T$ is less than zero, control is transferred from a conditional branch step 904 along a "YES"-branch 906 to a step 908. In step 908, the timer of the current node is advanced by a fraction, e.g., one half in this example, of the value of $\Delta\Delta T$. The advancement does not permanently reset the actual value of the timer. The advancement merely advances this timer period so that the token will be forwarded to its successor in a period shortened by $\Delta\Delta T/2$. After winding up the PT of the current node, the sub-system replaces in an update step 910 the token's $\Delta T$ value as received, being $\Delta T_p$, with a current $\Delta T$ value, being $\Delta T_c$. If $\Delta\Delta T$ is greater than or equal to zero, control is transferred directly to update step 910 along a "NO"-branch 912. After updating the token's $\Delta T$ value, the sub-system transfers control to the step 320 in a step 914.

It is to be noted that the topological configuration of the network in a directed graph serves the token-based protocols of the invention, and that the information processing or data processing communications, if any, among the nodes may, but need not, be constrained by this topology. For example, the invention could be applied to a security or safety system with multiple monitoring modules represented as nodes on a network. The protocol enables keeping track of the operational state of the system as a whole. Pre-assigned addresses and priority schemes control the defragmentation and healing so as to enable optimizing the tracking.

The above diagrams and flowcharts are merely one preferred procedure for accomplishing polling, node addition, node removal, healing, defragmenting, initial node staggering and testing node staggering during polling of a linked-node network of the present invention. Many of these flowchart step can be performed in different orders or by different functions that accomplish the same overall task. Additionally, although the invention has been disclosed with reference to its preferred embodiments, from reading this description those of skill in the art may appreciate changes and modification that may be made which do not depart from the scope and spirit of the invention as described above and claimed hereafter.

We claim:

1. An information processing system (100; 110; 150) comprising a plurality of information processing nodes (102, 106; 112, 118; 154*a–d*; 200), wherein: .
   the nodes are functionally connected to form a network;
   the system enables propagating a polling-token across the network;
   the network is topologically configured as a directed graph for a purpose of propagating the polling-token;
   each respective one of the nodes communicates (314) a polling-token along the network to a respective next one of the nodes;
   each respective one of the nodes has a respective polling-timer (234);
   the system initiates a reconfiguring (334) of the network if a specific one of the polling-timers expires before the polling-token is received.

2. The system of claim 1, wherein:
   a specific one of the nodes associated with the expired specific polling-timer is enabled to propagate (602) a relink-token along the network;
   each respective node receiving the relink-token is enabled to suspend (602) its respective polling-timer and is enabled to confirm receipt (604) of the relink-token to a preceding one of the nodes;
   each respective node has a respective response-timer (236) for monitoring the confirmation;
   each respective node is enabled to suspend (614) the respective response-timer upon receipt of the confirmation.

3. The system of claim 2, wherein:
   the system enables a particular one of the nodes whose response timer expired to be linked to the specific node whose polling-timer expired.

4. The system of claim 1, wherein:
   the system has first means (202, 204, 208, 210, 216, 218, 242) for determining a number of functionally active nodes on the network; and
   the system has second means for controlling setting the respective polling-timers dependent on the number of nodes determined (202, 204, 216, 218).

5. The system of claim 4, wherein:
   the polling-token is communicated from a current one of the nodes to the next node if the polling-timer of the current node expires;
   the second means sets (900–914)the polling timers so that they expire at substantially evenly staggered moments in time in the order of the nodes along the directed graph.

6. A method of enabling operation of an information processing system (100; 110; 150) having a network with a plurality of information processing nodes (102, 106; 112, 118; 154*a–d*; 200), wherein the nodes are topologically interconnected to form a directed graph, the method comprising:
   enabling each respective node to receive a polling-token from a respective preceding one of the nodes and to forward the polling-token to a respective succeeding one of the nodes;
   enabling each respective one of the nodes to reset a respective polling-timer (234) upon receipt of the polling token;
   enabling the system to initiate reconfiguring (334, 336, 700–720) the network upon expiry of a specific one of the respective polling-timers.

7. The method of claim 6, wherein each respective node has a respective response-timer (236) and wherein the reconfiguring comprises:
   enabling a specific one of the nodes associated with the expired specific polling-timer to propagate (602) a relink-token along the graph;

enabling each respective node receiving the relink-token to suspend (602) its respective polling-timer and to confirm to a preceding one of the nodes receipt of the relink-token;

enabling each respective node to suspend (614) the respective response-timer upon receipt of the confirmation.

8. The method of claim 7 wherein the reconfiguring comprises:

enabling a particular one of the nodes whose response timer expired to be linked to the specific node whose polling timer expired.

9. A method of enabling operating an information processing system having a network with a plurality of information processing nodes (102, 106; 112, 118; 154a–d; 200), wherein the nodes are interconnected topologically to form a directed graph, the method comprising:

enabling each respective node to receive a polling-token from a respective preceding one of the nodes and to forward the polling-token to a respective succeeding one of the nodes;

enabling each respective one of the nodes to reset a respective polling-timer (234) upon receipt of the polling token;

enabling determining a number (CV) of functionally active nodes on the network; and enabling controlling (900–914) the respective polling-timers dependent on the number of nodes determined.

10. The method of claim 9, wherein the controlling comprises setting the polling timers so that they expire at substantially evenly staggered moments in time in the order along the directed graph.

11. A method of functionally uniting a first and a second network (724a, 724b), wherein:

the first network has a first plurality of information processing nodes (C0–S0) configured in a first directed graph for a purpose of propagating a first polling-token across the first network;

the second network has a second plurality of information processing nodes (C1–S1) configured in a second directed graph for a purpose of propagating a second polling-token across the second network;

the method comprising:

enabling a first node in the first network to communicate (700) a message to the second network when in possession of the first polling-token; and enabling a second node in the second network to respond to the message when in possession of the second polling-token, enabling a third node succeeding the first node in the first network to become (716) a succeeding node to the second node in the second network; and enabling a fourth node succeeding the second node in the second network to become (716) the successor of the first node.

12. For use in an information processing network (100, 110, 150) forming a directed graph for a purpose of propagating a polling token across the network: an information processing node (200) comprising:

an input (230) for receipt of the polling token;

an output (232) for dispatch of the polling token;

a memory (204; 238–240) for storage of first and second addresses;

a timer (234) for monitoring a time period between dispatch and receipt of the polling token;

means for, under control of the timer, either dispatching a further polling token or sending relink message containing the first and second addresses.

\* \* \* \* \*